(12) United States Patent
Sasaki

(10) Patent No.: US 6,598,289 B1
(45) Date of Patent: Jul. 29, 2003

(54) METHOD OF MANUFACTURING THIN-FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 53 days.

(21) Appl. No.: 09/659,755

(22) Filed: Sep. 11, 2000

(30) Foreign Application Priority Data

Oct. 5, 1999 (JP) ............................................. 11-284233

(51) Int. Cl.[7] .......................... G11B 5/129; H04R 31/00
(52) U.S. Cl. ............................ 29/603.15; 29/603.13; 29/603.16; 451/5; 451/41; 360/126
(58) Field of Search ........................ 29/603.11, 603.13, 29/603.14, 603.15, 603.16, 603.17, 605, 606; 451/5, 41; 360/126, 317

(56) References Cited

U.S. PATENT DOCUMENTS

| | | | | | |
|---|---|---|---|---|---|
| 5,325,254 A | * | 6/1994 | Cooperrider | ................ | 360/126 |
| 5,438,747 A | * | 8/1995 | Krounbi et al. | ............... | 29/603 |
| 5,606,478 A | * | 2/1997 | Chen et al. | .................. | 360/126 |
| 5,622,525 A | * | 4/1997 | Haisma et al. | ................ | 451/41 |
| 5,691,867 A | * | 11/1997 | Onuma et al. | ............. | 360/126 |
| 5,700,380 A | * | 12/1997 | Krounbi et al. | ............... | 216/22 |
| 5,722,156 A | * | 3/1998 | Balfrey et al. | .......... | 29/603.08 |
| 5,749,769 A | * | 5/1998 | Church et al. | ................. | 451/5 |
| 5,793,578 A | * | 8/1998 | Heim | ......................... | 361/126 |
| 5,801,909 A | * | 9/1998 | Gray et al. | ................. | 360/126 |
| 5,885,131 A | * | 3/1999 | Azarian et al. | ................ | 451/5 |
| 5,995,343 A | * | 11/1999 | Imamura | ................... | 360/126 |
| 6,018,862 A | * | 2/2000 | Stageberg et al. | ........ | 29/603.14 |
| 6,043,959 A | * | 3/2000 | Crue et al. | ................... | 360/113 |
| 6,118,629 A | * | 9/2000 | Huai et al. | ................... | 360/126 |
| 6,122,144 A | * | 9/2000 | Chang et al. | ............... | 360/122 |
| 6,130,805 A | * | 10/2000 | Sasaki et al. | ............... | 360/126 |
| 6,195,872 B1 | * | 3/2001 | Sasaki | ..................... | 29/603.13 |
| 6,226,149 B1 | * | 5/2001 | Dill et al. | ................... | 360/126 |
| 6,296,776 B1 | * | 10/2001 | Sasaki | ......................... | 216/22 |
| 6,317,288 B1 | * | 11/2001 | Sasaki | ........................ | 360/126 |
| 6,327,116 B1 | * | 12/2001 | Watanabe et al. | .......... | 360/126 |
| 6,330,743 B1 | * | 12/2001 | Iijima et al. | ............. | 29/603.14 |
| 6,333,841 B1 | * | 12/2001 | Sasaki | ........................ | 360/317 |
| 6,353,995 B1 | * | 3/2002 | Sasaki et al. | ............ | 29/603.14 |

FOREIGN PATENT DOCUMENTS

| | | | | |
|---|---|---|---|---|
| JP | 62204419 A | * | 9/1987 | |
| JP | 04078010 A1 | * | 3/1992 | |

* cited by examiner

Primary Examiner—A. Dexter Tugbang
Assistant Examiner—Paul Kim
(74) Attorney, Agent, or Firm—Oliff & Berridge PLC

(57) ABSTRACT

A recording head has: a bottom pole layer and a top pole layer that include pole portions; a recording gap layer placed between the pole portions; and a thin-film coil located between the top and bottom pole layers, the coil being insulated from the pole layers. The top pole layer has a pole portion layer and a yoke portion layer. The step of making the yoke portion layer includes the steps of forming a frame made of an insulating material around a region where the yoke portion layer is to be formed; forming a layer including a magnetic material inside and on top of the frame; and forming the yoke portion layer with the layer remaining in the frame by flattening the top surface of the layer including the magnetic material so that the frame is exposed.

9 Claims, 10 Drawing Sheets

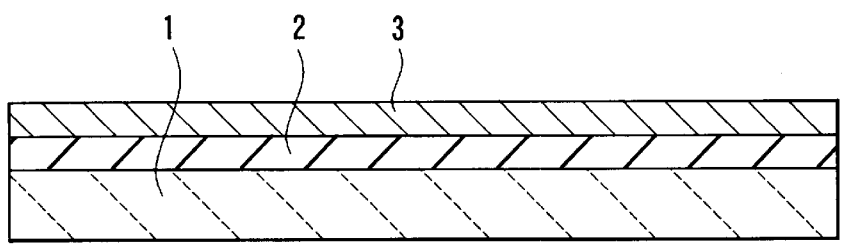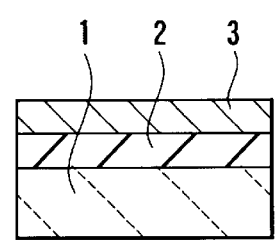
FIG. 1A  FIG. 1B
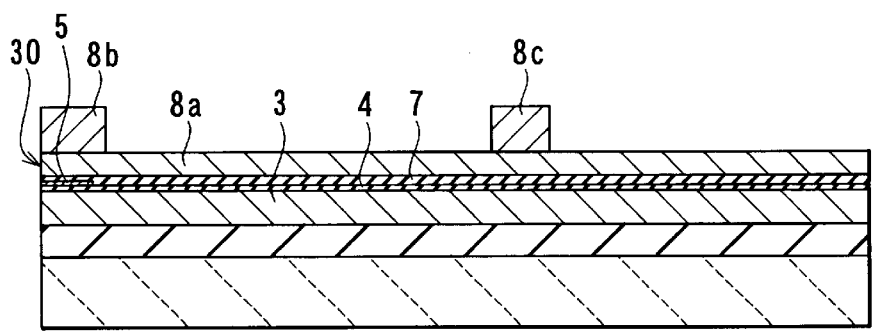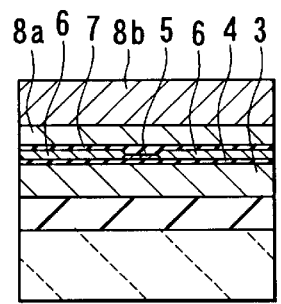
FIG. 2A  FIG. 2B

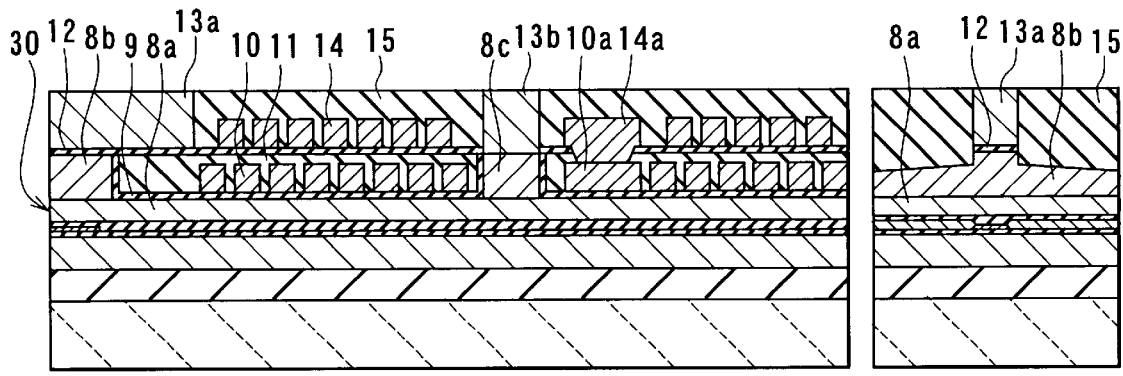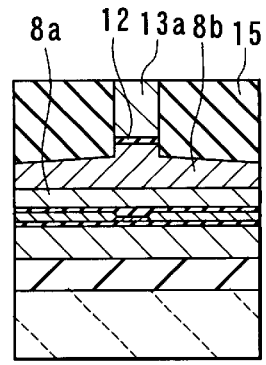
FIG. 5A  FIG. 5B
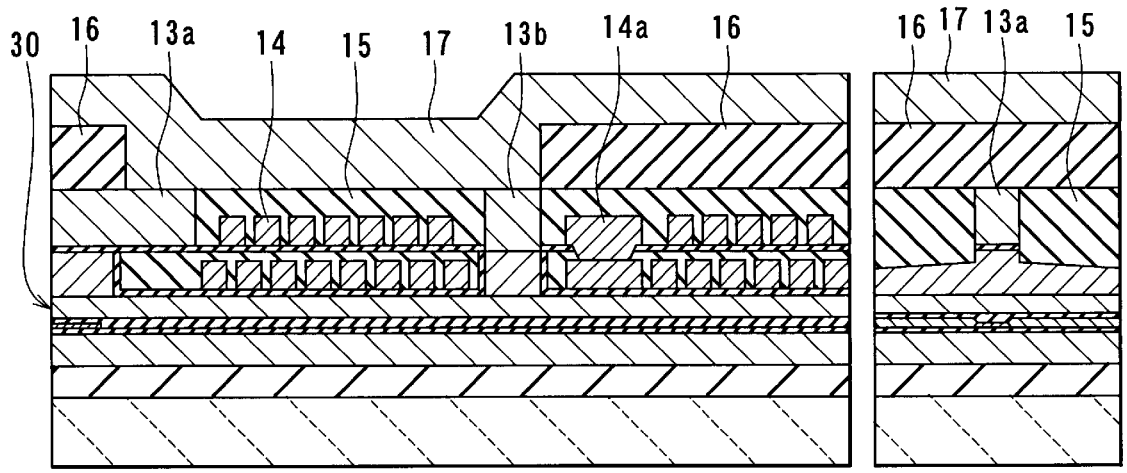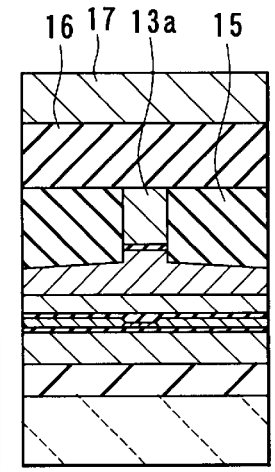
FIG. 6A  FIG. 6B

METHOD OF MANUFACTURING THIN-FILM MAGNETIC HEAD

BACKGROUND OF THE INVENTION

1. Field of the Invention

The present invention relates to a method of manufacturing a thin-film magnetic head comprising at least an induction-type magnetic transducer.

2. Description of the Related Art

Performance improvements in thin-film magnetic heads have been sought as surface recording density of hard disk drives has increased. Such thin-film magnetic heads include composite thin-film magnetic heads that have been widely used. A composite head is made of a layered structure including a recording head having an induction-type magnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein the width of top and bottom poles sandwiching the recording gap layer on a side of the air bearing surface is reduced down to microns or the submicron order. Semiconductor process techniques are utilized to implement such a structure.

Reference is now made to FIG. 10A to FIG. 13A and FIG. 10B to FIG. 13B to describe an example of a method of manufacturing a composite thin-film magnetic head as an example of a related-art method of manufacturing a thin-film magnetic head. FIG. 10A to FIG. 13A are cross sections each orthogonal to the air bearing surface of the thin-film magnetic head. FIG. 10B to FIG. 13B are cross sections of a pole portion of the head each parallel to the air bearing surface.

In the manufacturing method, as shown in FIG. 10A and FIG. 10B, an insulating layer 102 made of alumina ($Al_2O_3$), for example, having a thickness of about 5 to 10 $\mu$m is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 as an insulating layer is formed on the bottom shield gap film 104 and the MR element 105. The MR element 105 is embedded in the shield gap films 104 and 107.

Next, a top shield-layer-cum-bottom-pole-layer (called a bottom pole layer in the following description) 108 having a thickness of about 3 $\mu$m is formed on the top shield gap film 107. The bottom pole layer 108 is made of a magnetic material and used for both a reproducing head and a recording head.

Next, as shown in FIG. 11A and FIG. 11B, on the bottom pole layer 108, a recording gap layer 109 made of an insulating film such as an alumina film whose thickness is 0.2 $\mu$m is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 $\mu$m is formed for the recording head. At the same time, a magnetic layer 119 made of a magnetic material is formed for making the magnetic path in the contact hole 109a for making the magnetic path.

Next, as shown in FIG. 12A and FIG. 12B, the recording gap layer 109 and the bottom pole layer 108 are etched through ion milling, using the top pole tip 110 as a mask. As shown in FIG. 12B, the structure is called a trim structure wherein the sidewalls of the top pole portion (the top pole tip 110), the recording gap layer 109, and a part of the bottom pole layer 108 are formed vertically in a self-aligned manner.

Next, an insulating layer 111 made of alumina, for example, and having a thickness of about 3 $\mu$m is formed on the entire surface. The insulating layer 111 is then polished to the surfaces of the top pole tip 110 and the magnetic layer 119, and flattened.

Next, on the flattened insulating layer 111, a first layer 112 of a thin-film coil is made of copper (Cu), for example, for the induction-type recording head. Next, a photoresist layer 113 is formed into a specific shape on the insulating layer 111 and the first layer 112 of the coil. Heat treatment is then performed at a specific temperature to flatten the surface of the photoresist layer 113. On the photoresist layer 113, a second layer 114 of the thin-film coil is then formed. Next, a photoresist layer 115 is formed into a specific shape on the photoresist layer 113 and the second layer 114 of the coil. Heat treatment is then performed at a specific temperature to flatten the surface of the photoresist layer 115.

Next, as shown in FIG. 13A and FIG. 13B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider including the foregoing layers is performed to form the air bearing surface 118 of the thin-film magnetic head including the recording head and the reproducing head. The thin-film magnetic head is thus completed.

FIG. 14 is a top view of the thin-film magnetic head shown in FIG. 13A and FIG. 13B, wherein the overcoat layer 117 and the other insulating layers and insulating films are omitted.

In FIG. 13A, 'TH' indicates the throat height and 'MR-H' indicates the MR height. The throat height is the length (height) of portions of the two magnetic pole layers between the air-bearing-surface-side end and the other end, the portions facing each other with the recording gap layer in between. The MR height is the length (height) of the MR element between an end of the MR element located in the air bearing surface and the other end. In FIG. 13B, 'P2W' indicates the pole width, that is, the recording track width. In addition to the factors such as the throat height and the MR height, the apex angle as indicated with θ in FIG. 13A is one of the factors that determine the performance of a thin-film magnetic head. The apex is a hill-like raised portion of the coil covered with the photoresist layers 113 and 115. The apex angle is the angle formed between the top surface of the insulating layer 111 and the straight line drawn through the edges of the pole-side lateral walls of the apex.

With an increase in recording density of a hard disk drive used for computers and so on, the frequency of data to write or read through the use of a thin-film magnetic head has increased. Thin-film magnetic heads that exhibit an excellent high frequency characteristic are therefore desired.

If the frequency of data to write increases, eddy current loss increases in the magnetic layers making up the magnetic path of an induction-type magnetic transducer. An increase in eddy current loss results in problems such as: a reduction in intensity of a write magnetic field generated from the pole portions opposed to each other with the gap layer in between; an increase in delay between a write current supplied to the coil and generation of a write magnetic field; and a decrease in gradient of rise of a write magnetic field with respect to time. These problems are specifically represented as an increase in nonlinear transition shift (NLTS), for example.

It is therefore preferable that the magnetic layers are made of a high-resistance magnetic material in order to implement a thin-film magnetic head capable of operating in a good condition in a high frequency band.

It is difficult to form a magnetic layer of a high-resistance magnetic material through plating. Therefore, in the prior art, a layer of a high-resistance magnetic material is formed through sputtering, and an etching mask is formed on this layer through photolithography, the mask corresponding to a desired shape of the magnetic layer. The layer is then etched through ion milling, for example, using the mask. The magnetic layer is thus formed.

However, this method of making the magnetic layer has a problem that it takes a long time to etch the layer of the high-resistance magnetic material. Furthermore, ion milling may cause accumulation of electric charge in the stacked layers, and punctures of the very thin shield gap films between the MR element and the shield layers, for example, may be caused by a static discharge.

OBJECT AND SUMMARY OF THE INVENTION

It is an object of the invention to provide a method of manufacturing a thin-film magnetic head for allowing a magnetic layer of an induction-type magnetic transducer to be formed in a short time without any accumulation of electric charge.

The method of the invention is provided for manufacturing a thin-film magnetic head comprising: a medium facing surface that faces toward a recording medium; a first magnetic layer and a second magnetic layer magnetically coupled to each other and including magnetic pole portions opposed to each other and placed in regions on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The method includes the steps of: forming the first magnetic layer; forming the gap layer on the first magnetic layer; forming the second magnetic layer on the gap layer; and forming the coil. At least one of the step of forming the first magnetic layer and the step of forming the second magnetic layer includes the step of forming a layer including a yoke portion that faces the coil while the yoke portion is insulated from the coil. The step of forming the layer including the yoke portion includes the steps of forming a frame made of an insulating material around a region where the layer including the yoke portion is to be formed; forming a layer including a magnetic material inside and on top of the frame; and flattening a top surface of the layer including the magnetic material so that the frame is exposed.

According to the method of the invention, the layer including the yoke portion is formed through the flattening process, instead of etching.

According to the method of the invention, the layer including the magnetic material may be made of a high-resistance magnetic material. In the invention the high-resistance magnetic material is a magnetic material whose electrical resistance is 25 $\mu\Omega$-cm or greater.

According to the method of the invention, the layer including the magnetic material may be made of a plurality of layers of a magnetic material and at least one insulating film that are alternately stacked.

According to the method of the invention, the layer including the magnetic material may be formed through sputtering.

According to the method of the invention, the step of flattening may be performed through chemical mechanical polishing.

According to the method of the invention, at least one of the magnetic layers may include: a pole portion layer including one of the pole portions; and a yoke portion layer connected to the pole portion layer and including the yoke portion. In addition, the layer including the yoke portion may be the yoke portion layer. In this case, the at least part of the coil may be located on a side of the pole portion layer in the step of forming the coil. The method may further include the step of forming an insulating layer that covers the at least part of the coil located on the side of the pole portion layer, the insulating layer having a surface that faces the yoke portion layer, the surface being flattened together with a surface of the pole portion layer that faces the yoke portion layer. In this case, the yoke portion layer is formed on the pole portion layer and the insulating layer flattened.

The method may further include the step of forming an alumina film for insulating every neighboring turns of the thin-film coil from each other through low-pressure chemical vapor deposition.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of an embodiment of the invention.

FIG. 2A and FIG. 2B are cross sections for illustrating a step that follows FIG. 1A and FIG. 1B.

FIG. 5A and FIG. 5B are cross sections for illustrating a step that follows FIG. 4A and FIG. 4B.

FIG. 6A and FIG. 6B are cross sections for illustrating a step that follows FIG. 5A and FIG. 5B.

DETAILED DESCRIPTION OF THE PREFERRED EMBODIMENT

Figures 3A, 3B:
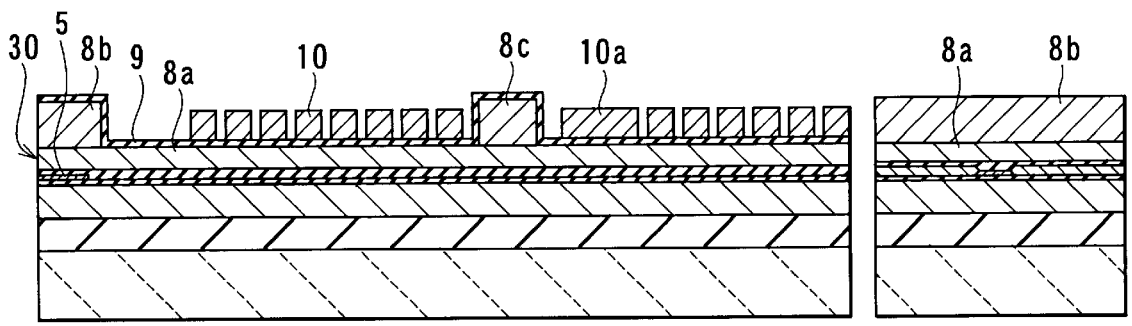
FIG. 3A and FIG. 3B are cross sections for illustrating a step that follows FIG. 2A and FIG. 2B.

A preferred embodiment of the invention will now be described in detail with reference to the accompanying drawings. Reference is now made to FIG. 1A to FIG. 7A, FIG. 1B to FIG. 7B, and FIG. 8 to describe a method of manufacturing a thin-film magnetic head of the embodiment of the invention. FIG. 1A to FIG. 7A are cross sections each orthogonal to an air bearing surface. FIG. 1B to FIG. 7B are cross sections of the pole portion each parallel to the air bearing surface.

In the manufacturing method, as shown in FIG. 1A and FIG. 1B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, although not shown, an insulating layer of alumina, for example, having a thickness of 4 to 5 $\mu$m, for example, is formed over the entire surface. This insulating layer is polished through chemical mechanical polishing (CMP), for example, so that the bottom shield layer 3 is exposed and the surface is flattened.

Next, as shown in FIG. 2A and FIG. 2B, on the bottom shield layer 3, a bottom shield gap film 4 having a thickness of about 20 to 40 nm, for example, is formed as an insulating film. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulating material used for the shield gap films 4 and 7 may be any of alumina, aluminum nitride, diamond-like carbon (DLC), and so on. The shield gap films 4 and 7 may be fabricated through sputtering or chemical vapor deposition (CVD). If the shield gap films 4 and 7 made of alumina films are formed through CVD, materials used are trimethyl aluminum ($Al(CH_3)_3$) and $H_2O$, for example. Through the use of CVD, it is possible to make the thin and precise shield gap films 4 and 7 with few pinholes.

Next, on the top shield gap film 7, a first layer 8a of a top-shield layer-cum-bottom-pole-layer (called a bottom pole layer in the following description) 8 having a thickness of about 1.0 to 1.5 $\mu$m is selectively formed. The bottom pole layer 8 is made of a magnetic material and used for both a reproducing head and a recording head. The bottom pole layer 8 is made up of a second layer 8b and a third layer 8c described later, in addition to the first layer 8a. The first layer 8a is located to face at least a part of a thin-film coil described later.

Next, the second layer 8b and the third layer 8c of the bottom pole layer 8, each having a thickness of about 1.5 to 2.5 $\mu$m, are formed on the first layer 8a. The second layer 8b includes a pole portion of the bottom pole layer 8 and is connected to a surface of the first layer 8a that faces toward a recording gap layer described later (on the upper side of FIG. 2A). The third layer 8c is provided for connecting the first layer 8a to a top pole layer described later. A portion of the second layer 8b facing the top pole layer has an end located farther from the air bearing surface (the medium facing surface that faces toward a recording medium) 30. The position of this end fines the throat height. The position of this end is the zero throat height position, that is, the position of an end of the pole portion located farther from the air bearing surface 30. In this embodiment the throat height is greater than the MR height.

The second layer 8b and the third layer 8c of the bottom pole layer 8 may be made of NiFe (80 weight % Ni and 20 weight % Fe), or NiFe (45 weight % Ni and 55 weight % Fe) as a high saturation flux density material and formed into specific shapes through plating, or may be made of a material such as FeN or FeZrN as a high saturation flux density material through sputtering, and then selectively etched through ion milling, for example, and formed into the specific shapes. Alternatively, a material such as CoFe or a Co-base amorphous material as a high saturation flux density material may be used.

Next, as shown in FIG. 3A and FIG. 3B, an insulating film 9 having a thickness of about 0.3 to 0.6 $\mu$m is formed over the entire surface.

Next, on the insulating film 9, a photoresist is patterned through a photolithography process to form a frame (not shown) used for making a first layer of the thin-film coil through frame plating. Next, the first layer 10 of the thin-film coil made of copper (Cu), for example, is formed by frame plating through the use of the frame. For example, the thickness of the first layer 10 is 1.0 to 2.0 $\mu$m and the pitch is 1.2 to 2.0 $\mu$m. The first layer 10 of the coil is wound around the third layer 8c of the bottom pole layer 8. A part of the first layer 10 is located on a side of the second layer 8b of the bottom pole layer 8 (that is, on the right side of FIG. 3A). The frame is then removed. In the drawings numeral 10a indicates a portion for connecting the first layer 10 to a second layer of the coil described later.

Figures 4A, 4B:
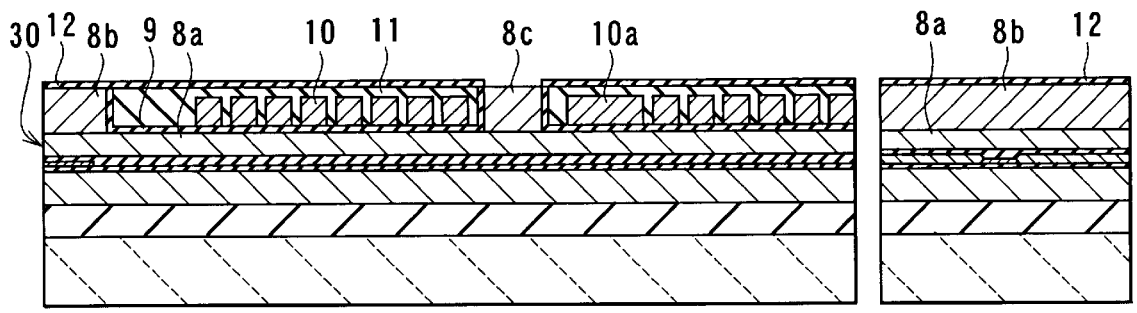
FIG. 4A and FIG. 4B are cross sections for illustrating a step that follows FIG. 3A and FIG. 3B.

Next, as shown in FIG. 4A and FIG. 4B, an insulating layer 11 of alumina, for example, having a thickness of about 3 to 4 $\mu$m is formed over the entire surface through low-pressure chemical vapor deposition (CVD), for example. If the space between every neighboring turns of the first layer 10 of the coil is filled with an alumina film through low-pressure CVD, it is possible to form the insulating film without cavities such as keyholes, between every neighboring turns of the first layer 10 wherein the pitch is small. Reliability is thereby improved. The insulating layer 11 is then polished through CMP, for example, until the second layer 8b and the third layer 8c of the bottom pole layer 8 are exposed, and the surface is flattened. Although the first layer 10 of the coil is not exposed in FIG. 4A, the first layer 10 may be exposed.

Next, a recording gap layer 12 made of an insulating material whose thickness is 0.2 to 0.3 µm, for example, is formed on the second layer 8b and the third layer 8c of the bottom pole layer 8 flattened and the insulating layer 11. In general, the insulating material used for the recording gap layer 12 may be alumina, aluminum nitride, a silicon-dioxide-base material, a silicon-nitride-base material, or diamond-like carbon (DLC) and so on. The recording gap layer 12 may be fabricated through sputtering or CVD. If the recording gap layer 12 made of an alumina film is formed through CVD, materials used are trimethyl aluminum (Al($CH_3$)$_3$) and $H_2O$, for example. Through the use of CVD, it is possible to make the thin and precise recording gap layer 12 with few pinholes.

Next, a portion of the recording gap layer 12 located on top of the third layer 8c of the bottom pole layer 8 is etched to form a contact hole for making the magnetic path. Portions of the recording gap layer 12 and the insulating layer 11 that are located on top of the connecting portion 10a of the first layer 10 are etched to form a contact hole.

Next, as shown in FIG. 5A and FIG. 5B, on the recording gap layer 12, a pole portion layer 13a including a pole portion of the top pole layer 13 is formed. The pole portion layer 13a has a thickness of 2 to 3 µm, for example. At the same time, a magnetic layer 13b having a thickness of 2 to 3 µm, for example, is fabricated in the contact hole formed in a portion on top of the third layer 8c of the bottom pole layer 8. The top pole layer 13 is made up of the pole portion layer 13a, the magnetic layer 13b and a yoke portion layer described later. The magnetic layer 13b is provided for connecting the yoke portion layer to the bottom pole layer 8.

The pole portion layer 13a and the magnetic layer 13b of the top pole layer 13 may be made of NiFe (80 weight % Ni and 20 weight % Fe), or NiFe (45 weight % Ni and 55 weight % Fe) as a high saturation flux density material through plating, or may be made of a material such as FeN or FeZrN as a high saturation flux density material through sputtering. Alternatively, a material such as CoFe or a Co-base amorphous material as a high saturation flux density material may be used.

Next, the recording gap layer 12 is selectively etched through dry etching, using the pole portion layer 13a of the top pole layer 13 as a mask. This dry etching may be reactive ion etching (RIE) using a chlorine-base gas such as $BCl_2$ or $Cl_2$, or a fluorine-base gas such as $CF_4$ or $SF_6$, for example. Next, the second layer 8b of the bottom pole layer 8 is selectively etched by about 0.3 to 0.6 µm through argon ion milling, for example. A trim structure as shown in FIG. 5B is thus formed. The trim structure suppresses an increase in the effective track width due to expansion of a magnetic flux generated during writing in a narrow track.

Next, on the recording gap layer 12, the second layer 14 of the thin-film coil made of copper, for example, is formed by frame plating. For example, the thickness of the second layer 14 is about 1.0 to 2.0 µm and the pitch is 1.2 to 2.0 µm. In the drawings numeral 14a indicates a portion for connecting the second layer 14 to the first layer 10 of the coil through the contact hole formed in the portion located on top of the connecting portion 10a. The second layer 14 of the coil is wound around the magnetic layer 13b of the top pole layer 13. A part of the second layer 14 is located on a side of the pole portion layer 13a of the top pole layer 13 (that is, on the right side of FIG. 5A).

Next, an insulating layer 15 of alumina, for example, having a thickness of about 3 to 4 µm is formed over the entire surface through low-pressure CVD, for example. If the space between every neighboring turns of the second layer 14 of the coil is filled with an alumina film through low-pressure CVD, it is possible to form the insulating film without cavities such as keyholes, between every neighboring turns of the second layer 14 wherein the pitch is small. Reliability is thereby improved. The insulating layer 15 is then polished through CMP, for example, until the pole portion layer 13a and the magnetic layer 13b of the top pole layer 13 are exposed, and the surface is flattened. Although the second layer 14 of the coil is not exposed in FIG. 5A, the second layer 14 may be exposed. If the second layer 14 is exposed, another insulating layer is formed on the second layer 14 and the insulating layer 15.

Next, the yoke portion layer of the top pole layer is formed through the following procedure on the pole portion layer 13a and the magnetic layer 13b of the top pole layer 13 flattened and the insulating layer 15. The yoke portion layer is connected to the pole portion layer 13a and the magnetic layer 13b and includes a yoke portion that faces toward the second layer 14 of the coil, the yoke portion being insulated from the second layer 14.

In the procedure of forming the yoke portion layer, as shown in FIG. 6A and FIG. 6B, a frame 16 made of an insulating material such as alumina and having a thickness of about 2 to 3 µm, for example, is formed through photolithography around a region where the yoke portion layer is to be formed.

Next, a layer 17 having a thickness of about 3 to 4 µm, for example, is formed inside and on top of the frame 16. The layer 17 includes a magnetic material to be used for making the yoke portion layer. The layer 17 may be formed through sputtering or plating, depending on the type of the magnetic material. The layer 17 may be formed through plating if the magnetic material used is NiFe (80 weight % Ni and 20 weight % Fe), or NiFe (45 weight % Ni and 55 weight % Fe) as a high saturation flux density material, for example. The layer 17 may be formed through sputtering if the magnetic material is a material such as FeN or FeZrN that is a high-resistance magnetic material and a high saturation flux density material. In addition to the foregoing examples, the material of the layer 17 may be a material such as CoFe or a Co-base amorphous material as a high saturation flux density material. To improve the high frequency characteristic, the layer 17 may be made of a plurality of layers of magnetic material such as Permalloy and at least one insulating film of inorganic insulating material such as alumina that are alternately stacked.

Figures 7A, 7B:
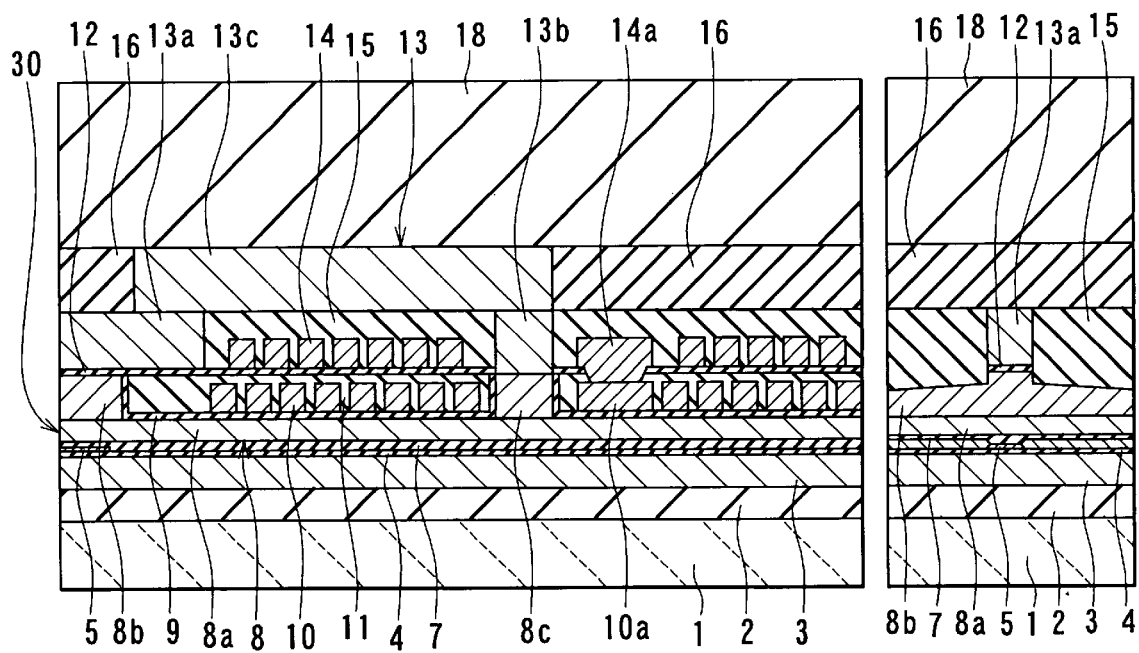
FIG. 7A and FIG. 7B are cross sections of the thin-film magnetic head fabricated through the method of the embodiment.

Next, as shown in FIG. 7A and FIG. 7B, the top surface of the layer 17 is polished so that the frame 16 is exposed, and the surface is flattened. This flattening process may be performed through CMP, for example. An unwanted portion of the layer 17 formed on top of the frame 16 is thereby removed. A portion of the layer 17 thus remaining inside the frame 16 makes up the yoke portion layer 13c.

Next, an overcoat layer 18 of alumina, for example, having a thickness of 20 to 40 µm is formed over the entire surface. The surface of the overcoat layer 18 is then flattened and pads (not shown) for electrodes are formed on the overcoat layer 18. Finally, lapping of the slider including the foregoing layers is performed to form the air bearing surface 30 of the thin-film magnetic head including the recording head and the reproducing head. The thin-film magnetic head is thus completed.

Figure 8:
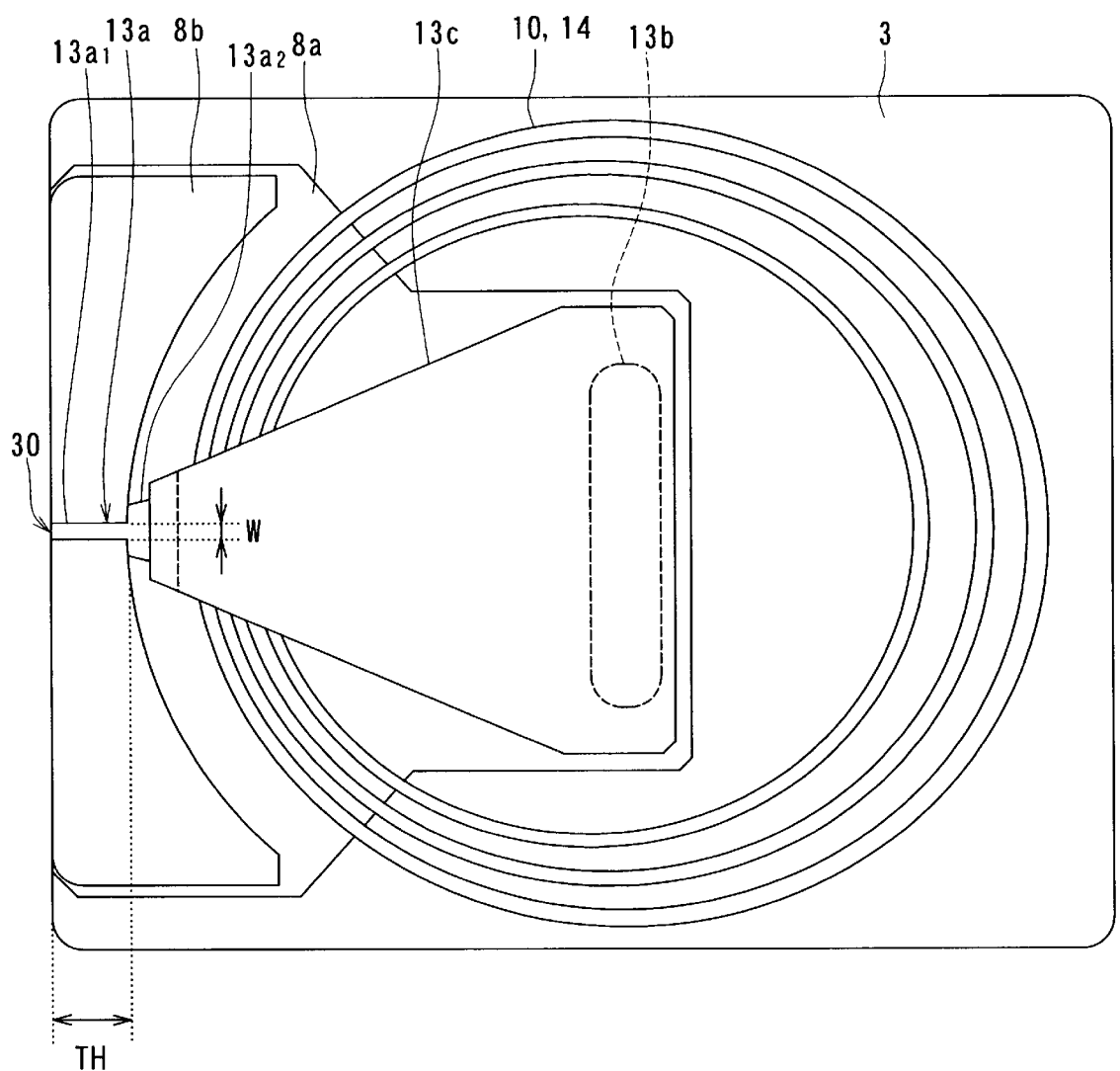
FIG. 8 is a top view of the thin-film magnetic head fabricated through the method of the embodiment.

FIG. 8 is a top view of the thin-film magnetic head fabricated through the manufacturing method of the embodiment, wherein the overcoat layer 18 and the other insulating layers and insulating films are omitted. In FIG. 8 'TH' indicates the throat height, and 'W' indicates the recording track width.

The pole portion layer 13a of the top pole layer 13 includes: a first portion $13a_1$ and a second portion $13a_2$, the first portion $13a_1$ being closer to the air bearing surface 30. The first portion $13a_1$ defines the recording track width of the recording head. That is, the first portion $13a_1$ has a width equal to recording track width W. The second portion $13a_2$ is greater than the first portion $13a_1$ in width.

The yoke portion layer 13c of the top pole layer 13 has an end face facing toward the air bearing surface 30. This end face is located at a distance from the air bearing surface 30. The yoke portion layer 13c has a portion located near the end thereof facing toward the air bearing surface 30. This portion is laid over the second portion $13a_2$ of the pole portion layer 13a. This portion of the yoke portion layer 13c is greater than the second portion $13a_2$ in width, and the width increases as the distance from the air bearing surface 30 increases.

In this embodiment the bottom pole layer 8 made up of the first layer 8a, the second layer 8b and the third layer 8c corresponds to the first magnetic layer of the invention. The top pole layer 13 made up of the pole portion layer 13a, the magnetic layer 13b and the yoke portion layer 13c corresponds to the second magnetic layer of the invention.

Figure 9:
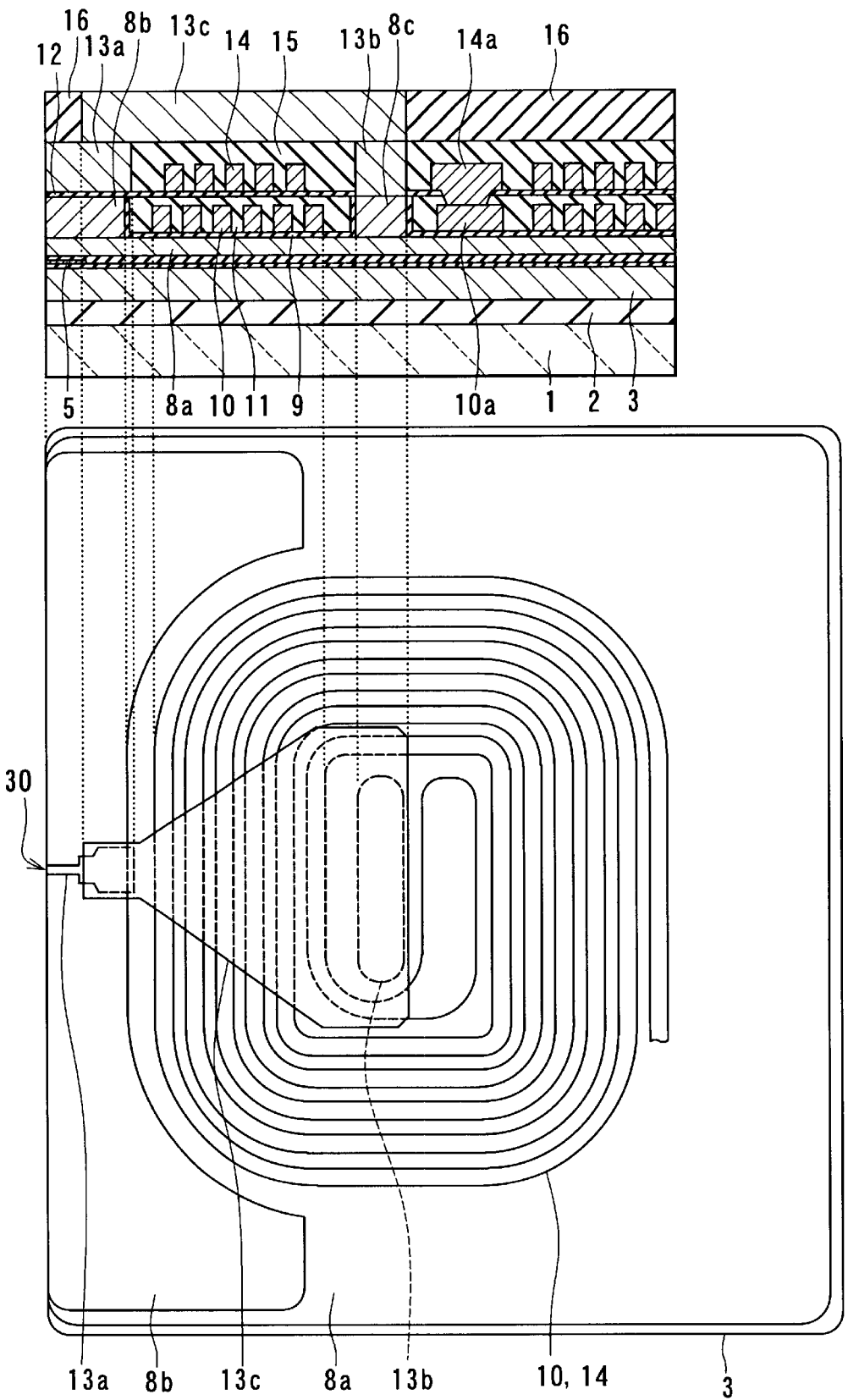
FIG. 9 is an explanatory view for illustrating another example of the thin-film magnetic head fabricated through the method of the embodiment.
Figures 10A, 10B:
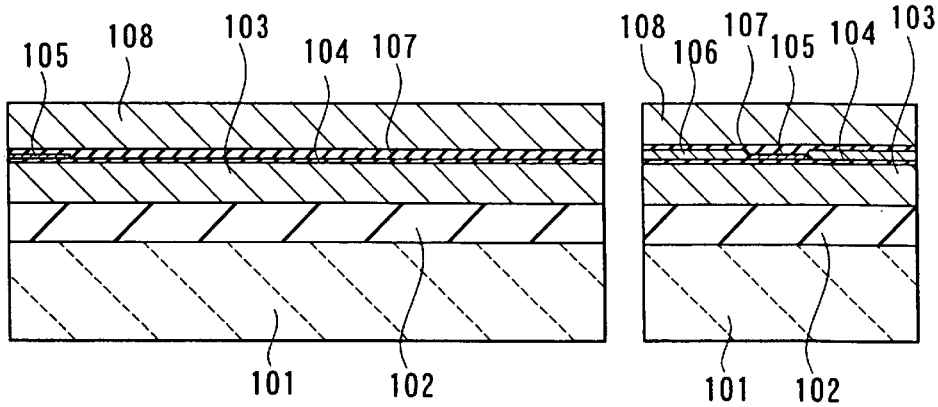
FIG. 10A and FIG. 10B are cross sections for illustrating a step in a method of manufacturing a thin-film magnetic head of related art.
Figures 11A, 11B:
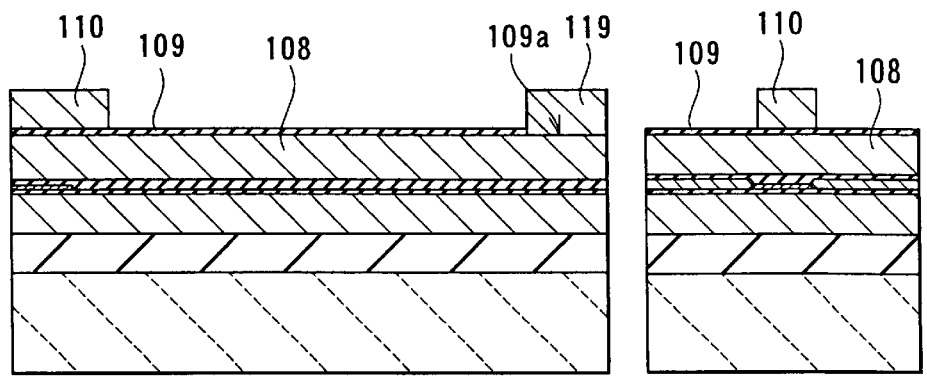
FIG. 11A and FIG. 11B are cross sections for illustrating a step that follows FIG. 10A and FIG. 10B.
Figures 12A, 12B:
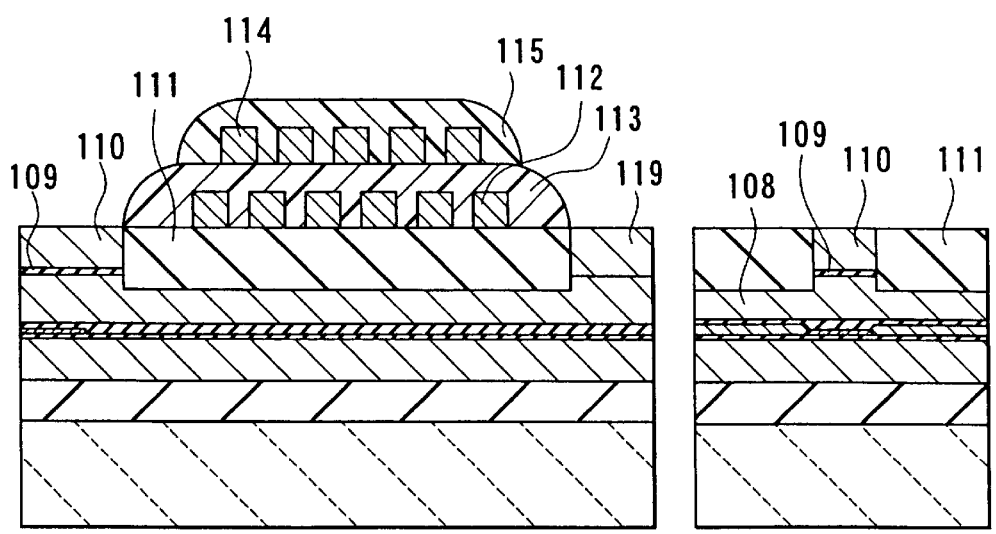
FIG. 12A and FIG. 12B are cross sections for illustrating a step that follows FIG. 11A and FIG. 11B.
Figures 13A, 13B:
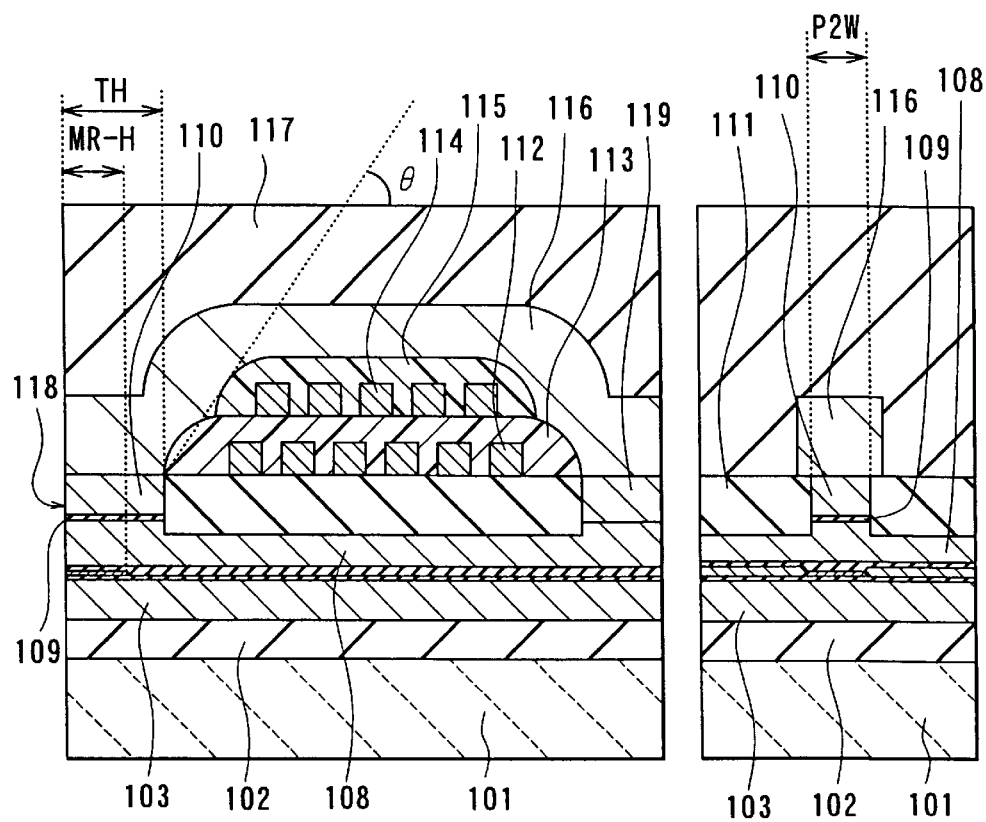
FIG. 13A and FIG. 13B are cross sections for illustrating a step that follows FIG. 12A and FIG. 12B.
Figure 14:
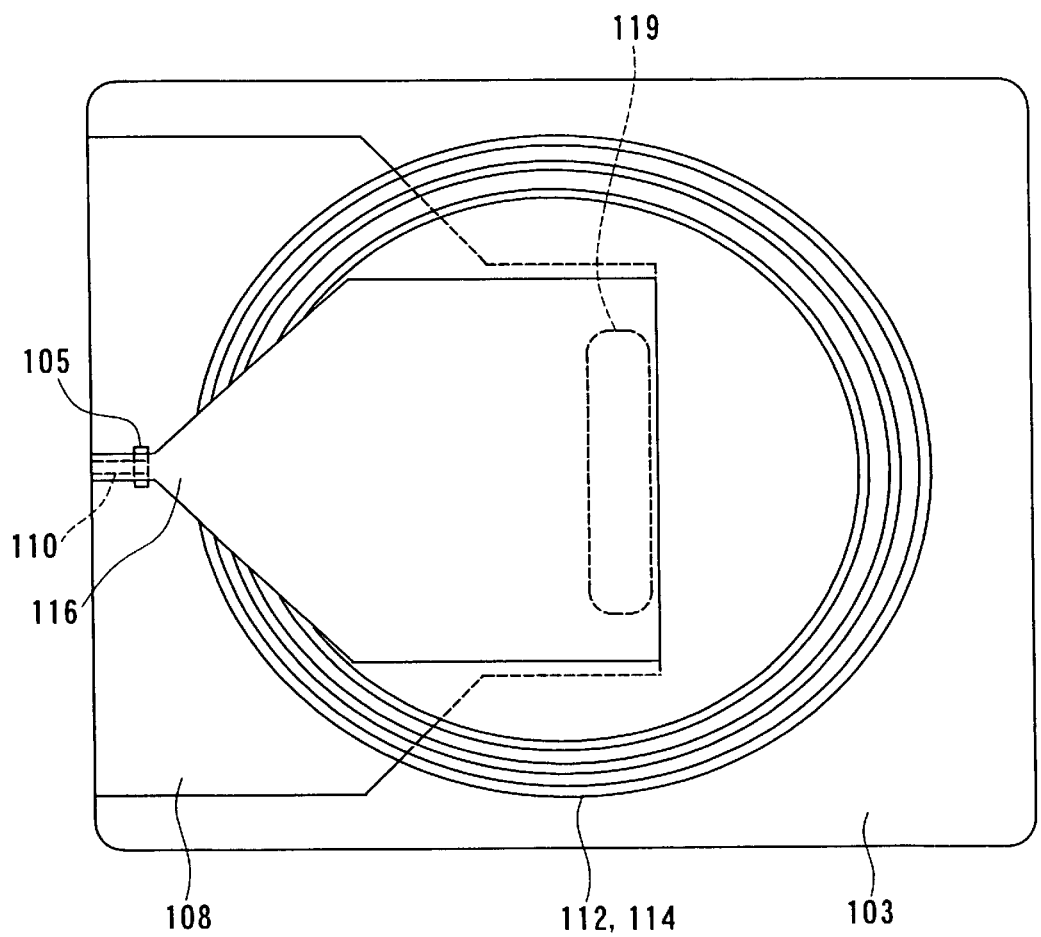
FIG. 14 is a top view of the related-art thin-film magnetic head.

FIG. 9 illustrates another example of the thin-film magnetic head fabricated through the method of the embodiment. FIG. 9 illustrates the relationship between a cross-sectional view (an upper view of FIG. 9) of a main part of the thin-film magnetic head and a top view (a lower view of FIG. 9) thereof.

In the example shown in FIG. 9, the second portion 8b of the bottom pole layer 8 has a portion facing the top pole layer 13. This portion has an end located farther from the air bearing surface 30. This end has the shape of a straight line parallel to the air bearing surface 30. It is thereby possible to control the throat height with accuracy.

In the example shown in FIG. 9, the other portion of the second layer 8b has an end located farther from the air bearing surface 30. This end has the shape of a circular arc similar to the shape of the perimeter of the first layer 10 of the thin-film coil. Since the second layer 8b thus extends over the wide area around the first layer 10 of the coil, it is possible that the top surface of the insulating layer 11 is made more even when the insulating layer 11 that covers the first layer 10 is flattened.

The remainder of the configuration of the thin-film magnetic head shown in FIG. 9 is similar to that of the head shown in FIG. 7A, FIG. 7B and FIG. 8.

As described so far, the thin-film magnetic head fabricated through the method of the embodiment comprises the medium facing surface that faces toward the recording medium (the air bearing surface 30), the reproducing head and the recording head (induction-type magnetic transducer). The reproducing head has: the MR element 5; and the bottom shield layer 3 and the top shield layer (bottom pole layer 8) for shielding the MR element 5. Portions of the bottom shield layer 3 and the top shield layer located in a region on a side of the air bearing surface 30 are opposed to each other, the MR element 5 being placed between these portions.

The recording head has the bottom pole layer 8 and the top pole layer 13 magnetically coupled to each other, each of which includes at least one layer. The bottom pole layer 8 and the top pole layer 13 include the pole portions opposed to each other and placed in regions on a side of the air bearing surface 30. The recording head further has: the recording gap layer 12 placed between the pole portion of the bottom pole layer 8 and the pole portion of the top pole layer 13; and the thin-film coil (including the layers 10 and 14) placed between the bottom pole layer 8 and the top pole layer 13, the coil being insulated from the bottom pole layer 8 and the top pole layer 13.

The top pole layer 13 includes: the pole portion layer 13a including the pole portion; and the yoke portion layer 13c connected to the pole portion layer 13a and including the yoke portion. The yoke portion faces the second layer 14 of the thin-film coil and is insulated from the coil.

In the embodiment the procedure of making the yoke portion layer 13c includes the steps of forming the frame 16 made of an insulating material around the region where the yoke portion layer 13c is to be formed; forming the layer 17 including a magnetic material inside and on top of the frame 16; forming the yoke portion layer 13c with the layer 17 remaining in the frame 16 by flattening the top surface of the layer 17 so that the frame 16 is exposed.

Therefore, according to the embodiment, it is possible to form the yoke portion layer 13c through a flattening process, instead of etching such as ion milling, even if the yoke portion layer 13c is made of a high-resistance magnetic material. As a result, it is possible to prevent the accumulation of electric charge in the stacked layers and to thereby prevent punctures of the very thin shield gap films 4 and 7 between the MR element 5 and the shield layers 3 and 8, for example, caused by a static discharge. According to the embodiment, the time required for forming the yoke portion layer 13c is shorter, compared to the case in which the yoke portion layer 13c is formed through etching such as ion milling.

According to the embodiment, it is possible to form the yoke portion layer 13c made of a high-resistance magnetic material without causing problems that could result from ion milling. It is thereby possible to reduce eddy current loss in the yoke portion layer 13c and to improve the high frequency characteristic of the recording head.

According to the embodiment, the second layer 8b of the bottom pole layer 8 defines the throat height. The first layer 10 of the thin-film coil is placed on top of the first layer 8a of the bottom pole layer 8 and on a side of the second layer 8b. The top surface of the insulating layer 11 that covers the first layer 10 is flattened, together with the top surface of the second layer 8b. The pole portion layer 13a of the top pole layer 13 is formed on the flattened surface, the recording gap layer 12 being placed between the pole portion layer 13a and the flattened surface. As a result, the pole portion layer 13a that defines the recording track width is formed on the flat surface. According to the embodiment, it is thereby possible to form the pole portion layer 13a with accuracy even if the recording track width is reduced down to the half-micron or quarter-micron order, and to control the recording track width with accuracy.

According to the embodiment, the second layer 14 of the thin-film coil is placed on a side of the pole portion layer 13a of the top pole layer 13, and the top surface of the insulating layer 15 that covers the second layer 14 is flattened, together with the top surface of the pole portion layer 13a. As a result, the yoke portion layer 13c of the top pole layer 13 is formed on the flat surface, too. According to the embodiment, it is thereby possible to reduce the dimensions of the yoke portion layer 13c, too. It is thereby possible to prevent 'side write', that is, data is written in a region of a recording medium where data is not supposed to be written, or 'side erase' that is, data is erased in a region where data is not supposed to be written.

According to the embodiment, an end face of the yoke portion layer 13c of the top pole layer 13 facing toward the air bearing surface 30 is located at a distance from the air bearing surface 30. As a result, it is impossible that the yoke portion layer 13c is exposed from the air bearing surface 30. 'Side write' and 'side erase' are thereby prevented.

The present invention is not limited to the foregoing embodiment but may be practiced in still other ways. For example, although the top pole layer 13 is made up of a plurality of layers in the embodiment, it may be made up of a single layer. In this case, the top pole layer 13 that is a single flat layer may be formed on the recording gap layer 12 if the thin-film coil is a single layer, that is, made of only the first layer 10 shown in FIG. 7A and FIG. 7B. This top pole layer 13 may be formed through a method similar to the method of forming the yoke portion layer 13c of the embodiment. Even if the coil is formed on the recording gap layer 12, and the top pole layer 13 of a single layer is formed on the coil, the top pole layer 13 being insulated from the coil, it is possible to make the top pole layer 13 through a method similar to the method of forming the yoke portion layer 13c of the embodiment as long as the coil is small in height.

In addition, the first layer 8a of the bottom pole layer 8 may be formed through a method similar to the method of forming the yoke portion layer 13c of the embodiment.

In the foregoing embodiment the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element, too.

The invention may be applied to a thin-film magnetic head comprising an induction-type magnetic transducer only and used for writing only, or may be applied to a thin-film magnetic head performing writing and reading through an induction-type magnetic transducer.

According to the method of manufacturing the thin-film magnetic head of the invention described so far, the layer including the yoke portion is formed through a method other than etching. It is thereby possible to form the magnetic layer of the induction-type magnetic transducer in a short time without causing accumulation of electric charge.

According to the method of the invention, the layer including a magnetic material may be made of a high-resistance magnetic material. In this case, it is possible to reduce eddy current loss in the magnetic layer and to improve the high frequency characteristic of the induction-type magnetic transducer.

According to the method of the invention, the layer including a magnetic material may be made of a plurality of layers of a magnetic material and at least one insulating film that are alternately stacked. In this case, it is possible to reduce eddy current loss in the magnetic layer and to improve the high frequency characteristic of the induction-type magnetic transducer.

According to the method of the invention, at least one of the magnetic layers may include the pole portion layer and the yoke portion layer, and at least a part of the thin-film coil is located on a side of the pole portion layer. In addition, the insulating layer may be formed to cover at least the part of the coil, the insulating layer being flattened together with the pole portion layer. Furthermore, the yoke portion layer may be formed on the pole portion layer and the insulating layer flattened. In this case, the yoke portion layer is formed on the flat surface with accuracy.

According to the method of the invention, the alumina film may be formed through low-pressure CVD to insulate every neighboring turns of the thin-film coil from each other. In this case, it is possible to form the insulating film without cavities between every neighboring turns of the coil.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head comprising: a medium facing surface that faces toward a recording medium; a first magnetic layer and a second magnetic layer magnetically coupled to each other and including magnetic pole portions opposed to each other and placed in regions on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers; the method including the steps of:

forming the first magnetic layer;

forming the gap layer on the first magnetic layer;

forming the thin-film coil so that the at least part of the coil is placed on the first magnetic layer;

forming the second magnetic layer on the gap layer and above the at least part of the coil; wherein one of the step of forming the first magnetic layer and the step of forming the second magnetic layer includes the step of forming a layer including a yoke portion, the layer including the yoke portion forming a part of one of the magnetic layers, so that the at least part of the thin-film coil is sandwiched between the layer including the yoke portion and the other one of the magnetic layers; the step of forming the layer including the yoke portion including the steps of:

forming a frame made of an insulating material around a region where the layer including the yoke portion is to be formed;

forming a layer including a magnetic material inside and on top of the frame, the layer including the magnetic material to be the layer including the yoke portion; and polishing the layer including the magnetic material so that the frame is exposed, the top surfaces of the frame and the layer including the magnetic material are flattened, the layer including the magnetic material has the same thickness as that of the frame, and a portion of the layer including the magnetic material remaining inside the frame makes up the layer including the yoke portion.

2. The method according to claim 1 wherein the layer including the magnetic material is made of a high-resistance magnetic material.

3. The method according to claim 1 wherein the layer including the magnetic material is made of a plurality of layers of the magnetic material and at least one insulating film that are alternately stacked.

4. The method according to claim 1 wherein the layer including the magnetic material is formed by sputtering.

5. The method according to claim 1 wherein the step of polishing is performed through chemical mechanical polishing.

6. The method according to claim 1 wherein:

the one of the magnetic layers includes: a pole portion layer including one of the pole portions; and a yoke portion layer connected to the pole portion layer and including the yoke portion; and the layer including the yoke portion is the yoke portion layer.

7. The method according to claim 6 wherein the at least part of the coil is located on a side of the pole portion layer and between the yoke portion layer of the one of the magnetic layers and the other one of the magnetic layers in the step of forming the coil.

8. The method according to claim 7, further including the step of forming an insulating layer that covers the at least part of the coil located on the side of the pole portion layer, the insulating layer having a surface that is closer to the yoke portion layer, the surface being flattened together with a surface of the pole portion layer that is closer to the yoke portion layer, wherein the yoke portion layer is formed on the pole portion layer and the insulating layer flattened.

9. The method according to claim 1, further including the step of forming an alumina film for insulating every neighboring turns of the thin-film coil from each other through low-pressure chemical vapor deposition.

* * * * *